June 28, 1932. E. D. CHAPLIN 1,864,801
GYROSCOPIC COMPASS
Filed Jan. 26, 1928
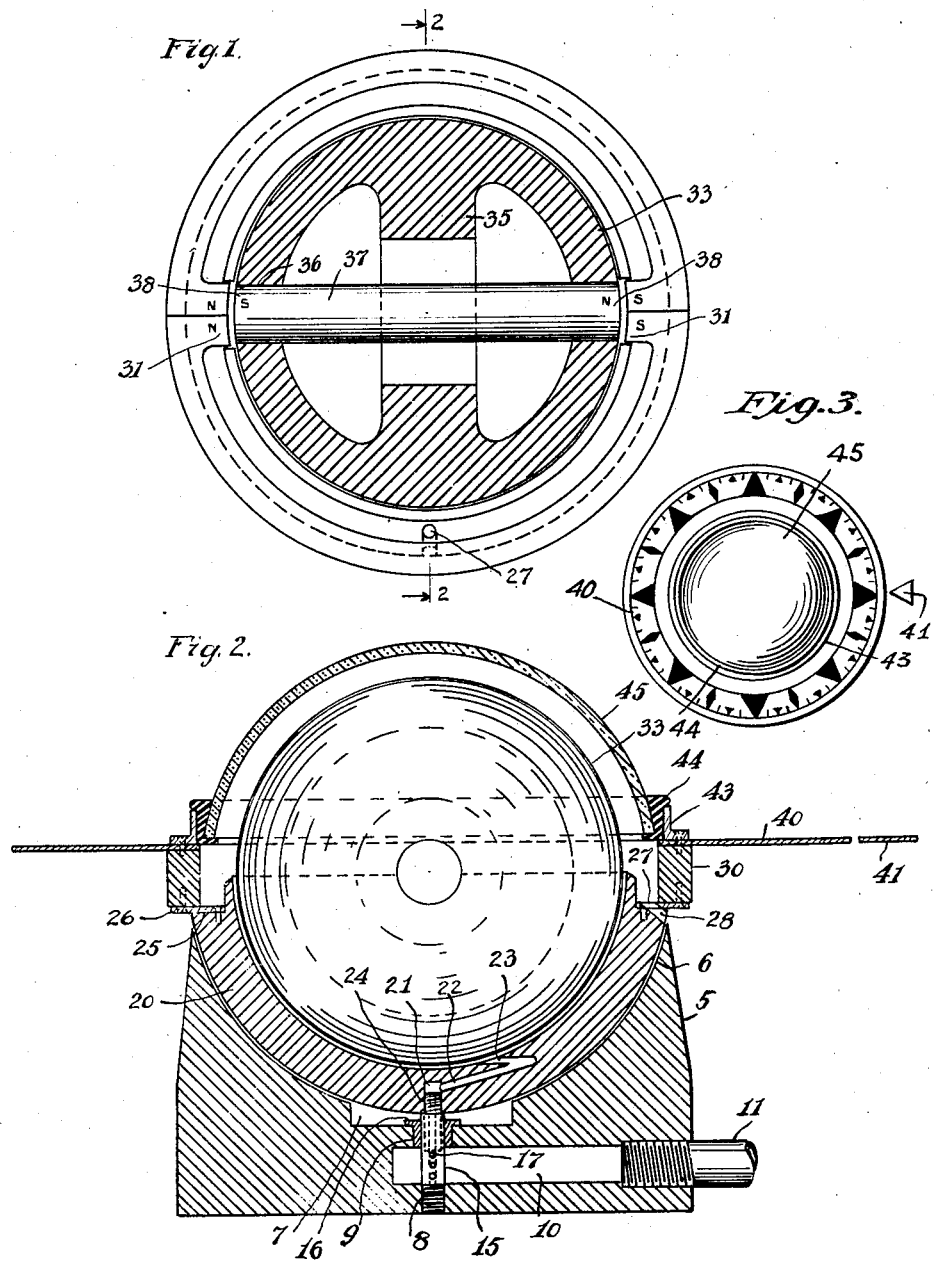
INVENTOR
Edwin D. Chaplin.
BY
Harold D. Penney ATTORNEY Patented June 28, 1932

1,864,801

UNITED STATES PATENT OFFICE

EDWIN D. CHAPLIN, OF NEW YORK, N. Y., ASSIGNOR TO HAROLD D. PENNEY, OF PELHAM, NEW YORK

GYROSCOPIC COMPASS

Application filed January 26, 1928. Serial No. 249,642.

This invention relates to gyroscopic compasses or other devices controlled by air floated gyro elements and to improvements in the devices described in U. S. Patents to R. E. Bibbins, No. 1,385,423, patented July 26, 1921; and No. 1,499,602, patented July 1, 1924.

One object of the invention is to provide in an apparatus or device of this kind an efficient means for controlling an indicator, dial or other device in accordance with the position of the gyro element which will be more positive and energetic in action than the ball compasses heretofore known.

Another object of the invention is to provide a control means or device of this kind in which there is no material connection between the gyro element and any part controlled thereby, and in which no material means is used in such control.

Another object of the invention is to provide an apparatus or device of this kind in which the gyro element controls by magnetic attraction.

Another object of the invention is to provide an apparatus or device of this kind in which the gyro element itself is very energetic and positive in action, at the same time being suitable for rotation by air.

Other objects of the invention are to improve generally the simplicity and efficiency of such devices and to provide a device or apparatus of this kind which is durable, economical to manufacture and operate and which will not get out of order.

Still other objects of the invention will appear as the description proceeds; and while herein details of the invention are described, the invention is not limited to these since many and various changes may be made without departing from the scope of the invention as claimed.

The inventive features for the accomplishment of these and other objects are shown herein in connection with an improved gyro apparatus which, briefly stated, includes a base cup in which is air-floated a substantially hemispherical shell or ball carrier movable on a vertical axis in said cup and provided with a suitable dial and also with a horizontally disposed magnet ring on its upper edge having inwardly pointed poles. A non-magnetic gyro ball in turn air-floated in the shell carries a magnet axially disposed in said ball held in alinement with said poles by their mutual attraction, in which the position of the dial bears a constant relation to the ball.

An important object of this present invention is to make the compass, known as a ball compass, much more positive and energetic in its action than those heretofore known, and to cause it to be practically dead beat in its operation and to register more accurately than heretofore.

The former ball compasses also failed to attach the floating vessel or shell carrying the air jet nozzle to the gyro member in any reliable or effective way; and though the axis of the ball may point steadily in a constant direction, the floating vessel and the direction of the compass dial card fastened thereto would vary therefrom many degrees. This is unavoidable as the force of the peripheral air on the wind vanes of the helmet or director of these former compasses is very weak and ineffective.

In the accompanying drawing showing by way of example one of many possible embodiments of the invention, Fig. 1 is a horizontal sectional view, partly in plan, showing the magnets and ball;

Fig. 2 is a vertical sectional view partly in elevation, taken on the line 2—2 of Fig. 1 looking in the direction of the arrow; and Fig. 3 is a reduced plan view of the improved device disclosed in Fig. 2.

The various movable parts of my device are carried on a base cup 5 of aluminum, bronze or other non-magnetic material adapted to be held poised in the usual manner, by gimbal rings or other devices not shown and provided with an upwardly opening hemispherical chamber on seat 6 having a microscopically smooth face. Said base cup is also provided at its lower part with an annular air cushion chamber 7, a vertical bore 8 enlarged at its upper part 9 and coaxial with said seat and chamber and intersected by a radial air inlet conduit 10 communicating with a source of compressed air or the like (not shown) by means of a pipe 11.

A bearing tube 15 having a closed and threaded lower end screwed and anchored in the lower part of said bore has its upper end part loosely received in a bushing 16 in the upper part of the bore, loose enough to permit some air to pass from the inlet conduit 10 into the cushion chamber 7. The intermediate part of the tube is provided with perforations 17 by which air may pass from the conduit 10 into the tube.

A substantially hemispherical floating carrier vessel or shell 20 having smooth inner and outer faces is floatingly received in said seat 6 and has an axial bore 21 closed at the upper end and opening through the said outer face. A small air passage extends approximately radially away from said axial bore and then turns toward the axis of the shell to form a nozzle 23 passing into said inner face approximately tangential thereto at a point short of the center of said face. An axial tube 24 having its upper end threaded and screwed in said axial bore has its lower end loosely received in said bearing tube, whereby air may pass between the tubes for furnishing a floating connection between the tubes whereby said shell is caused to float in said seat by air pressure therein and in the cushion chamber from the leakage around said tubes. Said tubes also serve to permit the shell to move only around the vertical axis of the base cup.

Said shell 20 is provided at the upper edge with an exterior annular ledge 25 on which is received a non-magnetic flat ring 26 secured on and projecting from said ledge and provided with an opening or port 27 for registering with an air passage or port 28 at the outer edge of said ledge.

A permanent magnet ring 30, which is here shown as comprised of a pair of semi-circular horse-shoe magnets, placed with the poles adjacent, is secured on said flat ring beyond said openings and is provided with diametrically opposite inwardly pointing permanent north and south poles 31 (Fig. 1) co-axial with an equatorial diameter of said shell. An exteriorly spherical partially hollow brass ball 33 floatingly received in said shell has its equatorial or peripheral part much thickened to form an annular gyro member 35 and is provided with polar openings 36 normally co-axial with the said magnet poles 31 and receiving fast therein a cylindrical permanent bar magnet 37 having its poles 38 unlike the adjacent magnet poles 31 of the magnet ring and, therefore, drawn adjacent to and attracted by said poles 31 whereby all of the poles are yieldably held alined and the gyro element 35 is yieldably held in a vertical plane and in a determined relation with the magnet ring, the shell 20 and an annular dial 40 secured on said magnet ring, said plane being free to revolve only about the vertical axis of the base cup and shell. Said dial moves adjacent the usual fixed lubber mark 41.

A non-magnetic flange ring 43 secured on said dial carries therein a hard rubber bezel 44 in turn carrying an approximately hemispherical glass cover 45 bezel spaced from said ball and concentric with said ball, shell and hemispherical chamber.

The operation of the device is very simple. Air is supplied under pressure through the pipe 11, and small quantities thereof leaking out around the tubes 15 and 24 form an antifriction film of air between the tubes and between the shell and the seat 6, whereby the shell is given a fully floating support, but is at the same time prevented from moving in any direction except on the axis of the cup, tubes and shell. Air that passes through the pipe 11, the conduit, the tubes and the nozzle 23 over three-quarters of the way around the ball to the ports 27, 28 and thus rotates the ball at a very high velocity so that the axis of the gyro element 35 will tend to assume the direction of the plane of the meridian.

As the mass of the sphere is greatest at its peripheral part 35, the gyroscopic action of the ball mass for mass is greater in proportion to its total weight than if the ball were a homogeneous sphere.

Since the magnet ring and bar magnet have opposite poles adjacent, they tend to form a neutral magnetic system which is not particularly affected by variations in the exterior magnetic field, and as the gyro element itself finds its own direction, the magnetism of the ring and bar are not needed to help the compass in finding its north and south position.

I claim as my invention:

1. In combination, a hollow semi-spherical rotatable carrier having magnet poles thereon; a gyro member rotatable in the hollow of said carrier and also carrying poles, said second poles being rotatable for directionally controlling rotation of said carrier.

2. In combination, a rotatable carrier; a gyro ball member air floated and rotatable in said carrier; and associated magnets whereby said carrier is positioned by the member.

3. In combination, a rotatable carrier shell having opposite magnet poles thereon; and a gyro bar air-floated and rotatable in said carrier and carrying a magnet, said latter magnet having poles for cooperating with said first poles to directionally control rotation of said carrier.

4. In combination, a carrier movable about a vertical axis; a horizontal magnet ring on the carrier having inwardly pointing poles and carrying a dial; a ball rotatable in the carrier; and a magnet disposed diametrically in said ball for directionally controlling said carrier.

5. In combination, a base cup; a ball-carrying shell movable on a vertical axis in said cup; a horizontally disposed magnet ring on said shell and having inwardly pointed poles; a non-magnetic ball in the shell; and a magnet diametrically disposed in said ball for directionally controlling said carrier.

6. An exteriorly spherical hollow gyro member having a thickened peripheral part, extending inwardly from the wall thereof, said member also having an exterior surface suitable for rotating by air.

7. In combination, a rotatable carrier; a hollow ball having a diametral annular internally projecting rib rotatable on said carrier and means carried by said ball and carrier whereby said carrier is positioned by the ball.

8. In combination, a base cup; a ball carrying shell movable about a vertical axis in said cup; a horizontally disposed magnet ring on said shell and having opposite inwardly pointing permanent north and south magnetic poles, a hollow sphere in said shell having polar openings, the peripheral part of said sphere being much thickened to form an annular rib portion arranged in a plane normal to the diameter through said openings; and a cylindrical permanent magnet secured in said openings and having its poles adjacent to said magnet poles whereby to directionally control movement of said shell with its magnet.

9. In combination, a revoluble shell having an air outlet means carried by said shell forming opposed magnet poles; a gyro member air floated and rotatable in said shell and carrying a magnet acting to aline the poles with itself; and a closed cover on said shell.

10. In combination, a rotatable carrier having an annular dial card mounted thereon, an air-floated gyro ball rotatably disposed on said carrier, magnets mounted on said carrier, and a cooperating magnet carried by said ball for directionally controlling rotation of said carrier with its mountings.

Signed at New York, in the county of New York and State of New York, this 23rd day of January, A. D. 1928.

EDWIN D. CHAPLIN.